United States Patent [19]

Haneda et al.

[11] Patent Number: 4,814,797
[45] Date of Patent: Mar. 21, 1989

[54] APPARATUS AND METHOD FOR CONTROLLING COLOR DOT SIZE IN MULTICOLOR IMAGE

[75] Inventors: Satoshi Haneda; Hisashi Shoji; Hiroshi Fuma, all of Hachioji, Japan

[73] Assignee: Konishiroku Photo Industry Co., Ltd., Tokyo, Japan

[21] Appl. No.: 841,428

[22] Filed: Mar. 19, 1986

[30] Foreign Application Priority Data

Mar. 30, 1985 [JP] Japan .................................. 60-66987

[51] Int. Cl.$^4$ .................. G03G 15/01; H04N 1/46
[52] U.S. Cl. ...................... 346/157; 358/80; 430/43
[58] Field of Search ................ 355/4, 14 E; 346/157, 346/160; 358/75, 296, 298, 80; 430/42, 43

[56] References Cited

U.S. PATENT DOCUMENTS

| | | | |
|---|---|---|---|
| 4,130,841 | 12/1978 | Walsh et al. | 358/298 |
| 4,408,871 | 10/1983 | Kojima | 355/14 E X |
| 4,599,285 | 7/1986 | Haneda et al. | 355/4 X |
| 4,626,901 | 12/1986 | Tanioka | 358/298 X |
| 4,663,662 | 5/1987 | Sekizawa et al. | 358/75 |
| 4,680,625 | 7/1987 | Shoji et al. | 358/75 X |
| 4,680,646 | 7/1987 | Ikeda et al. | 358/298 |

*Primary Examiner*—Arthur T. Grimley
*Assistant Examiner*—J. Pendegrass
*Attorney, Agent, or Firm*—James E. Nilles; Thomas F. Kirby

[57] ABSTRACT

A multicolor image forming apparatus for forming a multicolor visual image on an image retainer, wherein latent images formed on the image retainer are successively developed on a color basis. The diameter of dots constituting the visual image of each color or each color image signal cutting size out of a matrix unit having picture elements of each color is modulated by an electrical signal.

15 Claims, 11 Drawing Sheets

FIG. 1
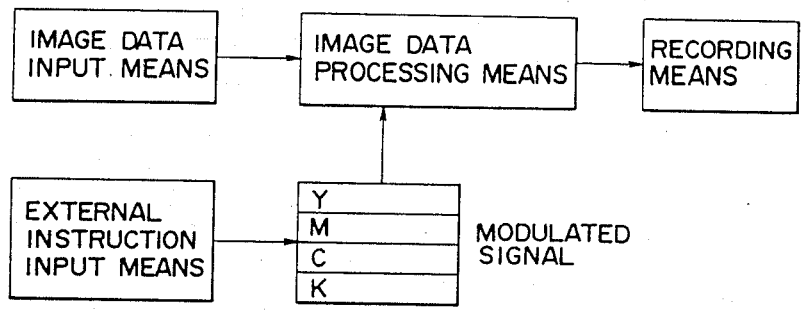
FIG. 2A
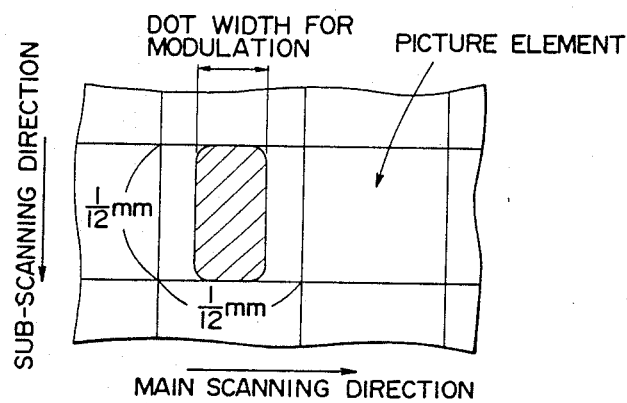
FIG. 2B
| Y | M | Y | M | Y | M | Y | M |
| C | K | C | K | C |   |   |   |
| Y | M | Y | M | Y | M | Y | M |
| C | K | C | K | C |   |   |   |
| Y | M | Y | M | Y | M | Y | M |
| C |   | C |   | C |   |   |   |
| Y |   | Y |   | Y |   | Y |   |
|   |   |   |   |   |   |   |   |
Y: 4×4 (REGION WHERE YELLOW IS WRITTEN)
M: 3×4 (REGION WHERE MAGENTA IS WRITTEN)
C: 3×3 (REGION WHERE CYAN IS WRITTEN)
K: 2×2 (REGION WHERE BLACK IS WRITTEN)
WHITE: BLANK

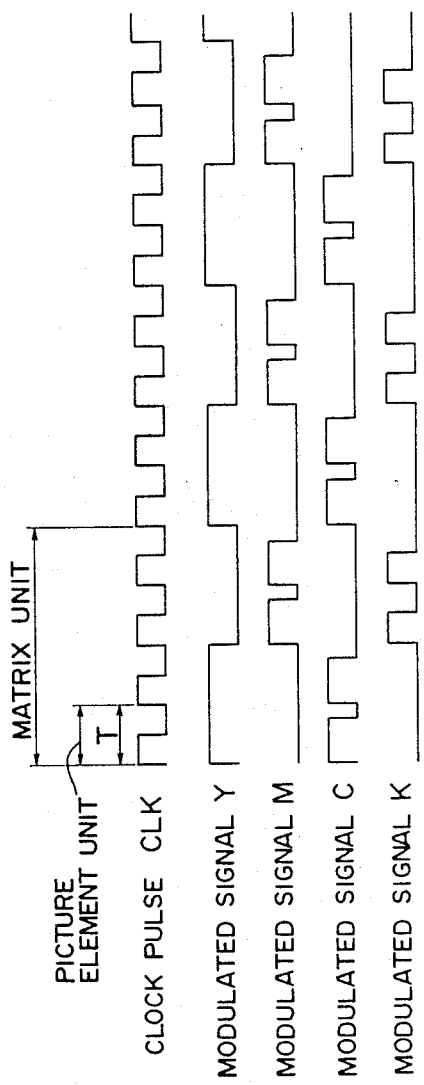
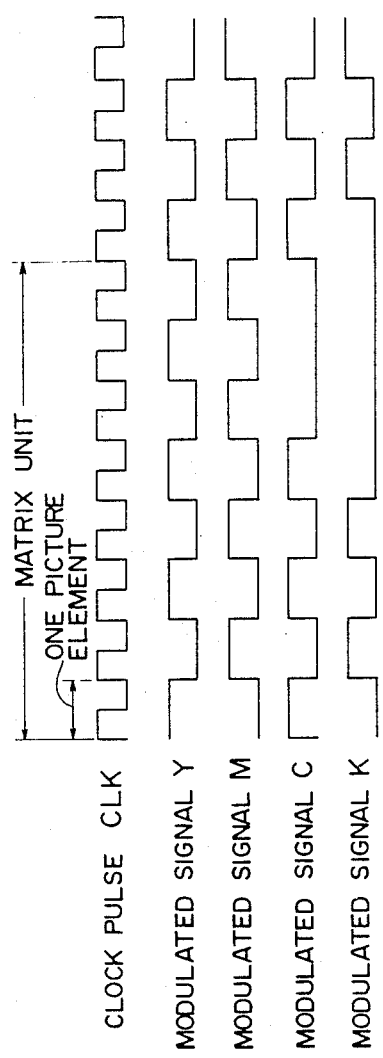

FIG. 13A
| 0 | 32 | 8 | 40 |
|---|----|---|----|
| 48 | 16 | 56 | 24 |
| 12 | 44 | 4 | 36 |
| 60 | 28 | 52 | 20 |
FIG. 13B
| 0 | 35 | 9 | 44 |
|---|----|---|----|
| 53 | 18 | 62 | 26 |
| 13 | 18 | 4 | 40 |
| 63 | 31 | 57 | 22 |
FIG. 13C
| 0 | 38 | 10 | 48 |
|---|----|----|----|
| 58 | 19 | 63 | 29 |
| 14 | 53 | 5 | 43 |
| 63 | 34 | 62 | 24 |
FIG. 13D
| 0 | 45 | 11 | 56 |
|---|----|----|----|
| 63 | 22 | 63 | 34 |
| 17 | 62 | 6 | 50 |
| 63 | 39 | 63 | 28 |
FIG. 14
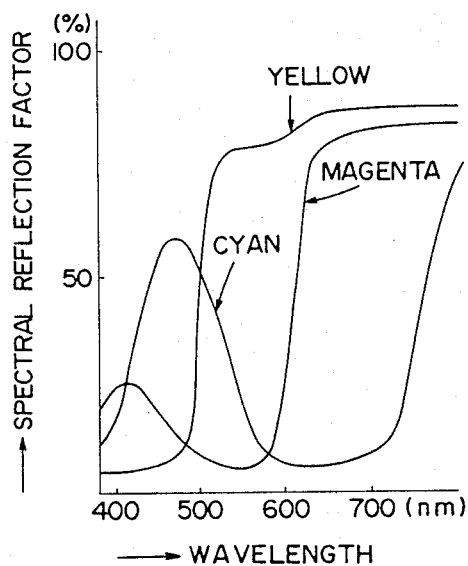
FIG. 15
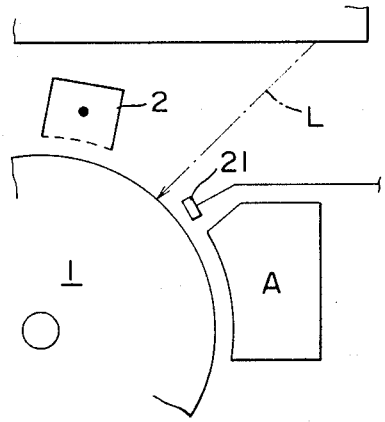

FIG. 16
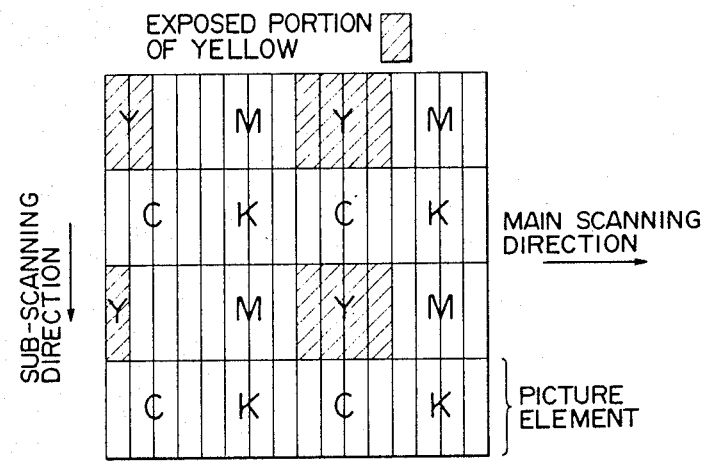
FIG. 17
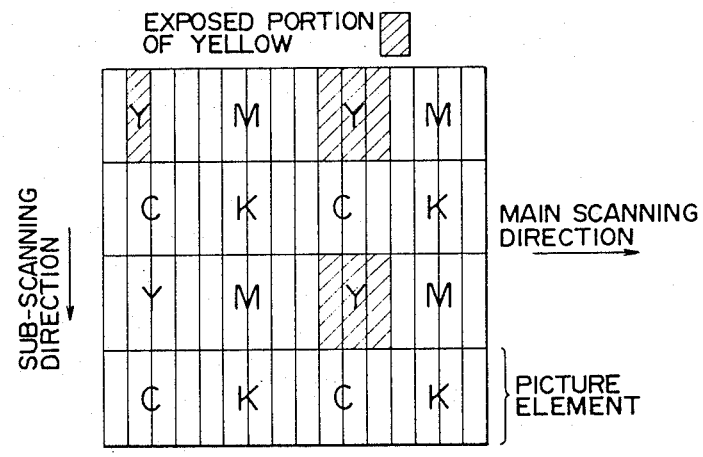
PRIOR ART FIG. 19
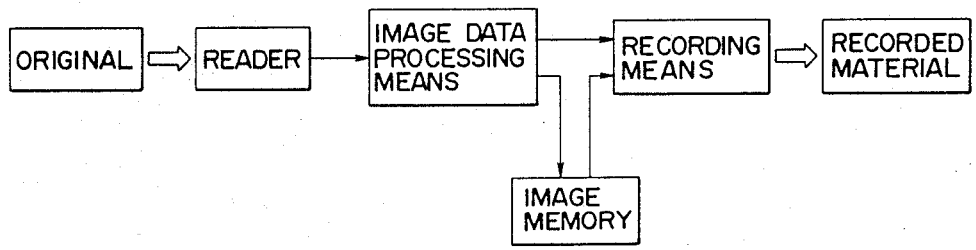

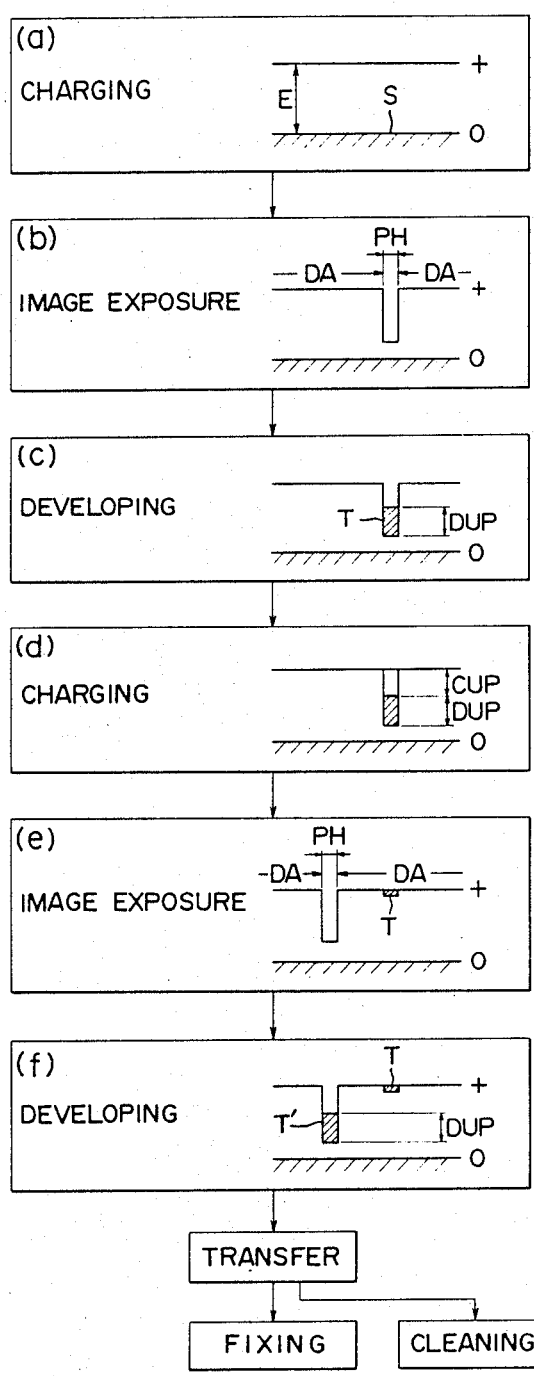
PRIOR ART FIG. 18
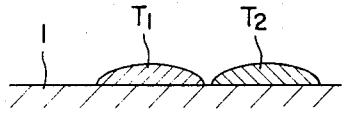
FIG. 21A
PRIOR ART
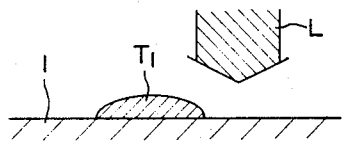
FIG. 21B
PRIOR ART
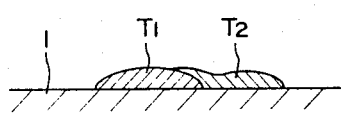
FIG. 21C
PRIOR ART
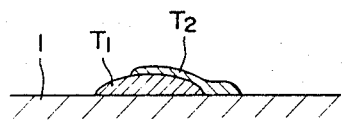
FIG. 22
PRIOR ART
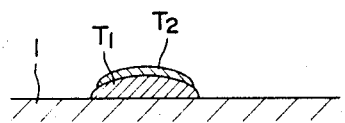
FIG. 23
PRIOR ART

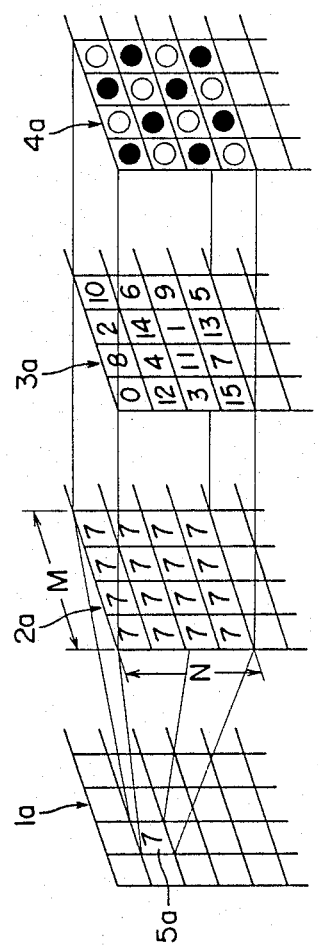
PRIOR ART FIG. 24
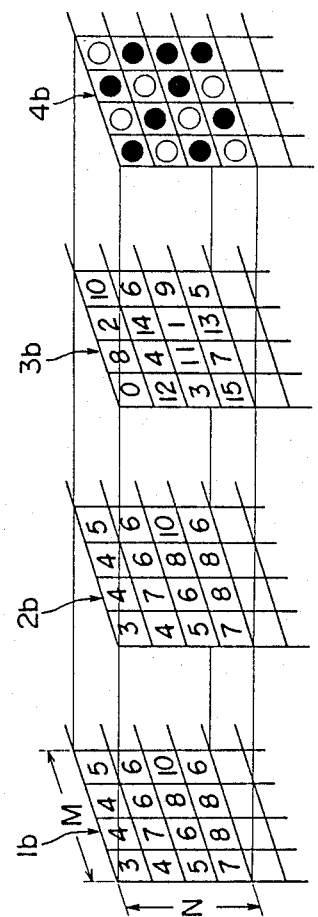
PRIOR ART FIG. 25

APPARATUS AND METHOD FOR CONTROLLING COLOR DOT SIZE IN MULTICOLOR IMAGE

BACKGROUND OF THE INVENTION

1. Field of the Invention

This invention relates to a multicolor image forming apparatus and more particularly to an improved multicolor image forming apparatus for obtaining a multicolor image by successively forming images of different colors on an image retainer based on image data and suitable for use in electrostatic recording or electrophotography. More specifically, this invention relates to apparatus and method for controlling color dot size in a multicolor image.

2. Description of the Prior Art

Heretofore, multicolor images have been formed, for example, by means of electrophotography, wherein a copying process, including charging, exposing, developing and transferring steps, in is repeated on a component color basis and toner images of various colors are superposed on copying paper. Latent images provided by the above-described steps are formed using the separated light of blue, green, red, etc. obtained from a color separation filter and toner images are formed by developing the latent images with yellow (Y), magenta (M), cyan (C) and, if necessary, black (K) toners and then the toner images are transferred to and superposed on recording paper to form a multicolor image. However, such a multicolor image forming method is disadvantageous in that ① the apparatus becomes large-sized and the time required for image formation is lengthy because toner images must be transferred to a transfer member each time the color development is completed; and ② registering accuracy must be guaranteed because image transfer is repeated.

There has been proposed a multicolor image forming method intended to solve the above-described problems by developing a plurality of toner images superposed on one and the same photosensitive member so that the transfer process may be completed at one time. (The expression "superposition of toner images" as used herein means not only a case where toner particle layers forming an image are physically superposed but also another case where they are not physically superposed but toner separately adheres to the photosensitive member in different positions, and the same definition will apply to the following) description. Nevertheless, bad effects are still brought about when using that method and result from disturbing the toner image obtained from development in the preceding stage or from upsetting color balance in a multicolor image when the toner in the developer in the preceding stage mixes with that in the following stage.

The method proposed to avoid such disadvantages comprises applying a bias voltage with an a.c. component superposed thereon to a developing device during and after the second development and flying toner onto the electrostatic image formed on a photosensitive member to form a multicolor image. Since the layer of a developer is prevented from rubbing the toner images formed up to the preceding stage in that method, no disturbance of the image occurs.

Referring to the flowchart of FIG. 18, the principle of the prior art image forming method will now be described. FIG. 18 shows changes in potential on the surface of a photosensitive member, taking a case where the charging electrode polarity is positive as an example. In FIG. 18, there are shown the exposed portion PH of a photosensitive member, the unexposed portion DA of the photosensitive member and an increase DUP in electric potential due to the attaching of positively charged toner to the exposed portion PH derived from the first developing.

The photosensitive member is uniformly charged by a scorotron charger and the surface thereof is at a fixed positive surface potential E as shown in FIG. 18(a). Subsequently, a first image exposure is applied with a laser, CRT, LED, or a liquid crystal shutter as an exposure source and the potential of the exposed portion PH decreases in proportion to the quantity of light as shown in FIG. 18(b). The electrostatic latent image thus formed is developed by a developing device and carries the positive bias applied thereto, the positive bias being roughly equal to the surface potential E of the unexposed portion thereof. Consequently, the positively charged toner T is allowed to adhere to the exposed portion PH at a relatively low potential as shown in FIG. 18(c) and the first toner image T is formed. Although the potential of the region where the toner image T has been formed rises by DUP because of the positively charged toner T adhering thereto, it does not become equipotential to that of the unexposed portion DA. The surface of the photosensitive member provided with the first toner image formed thereon is subsequently charged again by the charger and remains at a uniform surface potential E, irrespective of the presence of the toner T, which is illustrated in FIG. 18(d). A second image exposure is applied to the surface of the photosensitive member to form an electrostatic latent image FIG. 18(e) and, as in the case of FIG. 18(c), a positively charged toner image T' different in color from the toner T is developed to obtain a second toner image, which is shown in FIG. 18(f). The process above described is repeated to obtain a multicolor toner image on the photosensitive member. The image is then transferred to recording paper and heated or pressurized for fixing and a multicolor recording image is obtained. In that case, the toner and charge remaining on the surface of the photosensitive member are removed and cleaned and used for a subsequent multicolor image formation. On the other hand, there is another method of fixing a toner image on the photosensitive member.

In the method described in FIG. 18, at least the developing step of FIG. 18(f) should preferably be implemented without allowing the developer layer to contact the surface of the photosensitive member.

In the above-described method of multicolor image formation, the second and following charging may be omitted. When charging is repeated each time without such omission, a charge eliminating step may be added before charging by means of a lamp or corona discharge. Moreover, the exposure light source used for each image exposure may be either the same or different.

In the above-described method of multicolor image formatio, toners of four colors, i.e., yellow, magenta, cyan and black are often superposed for the following reason: A black image ought to be obtained by superposing the three primary colors of yellow, magenta and cyan but, because the toners for the three primary colors do not, as a practical matter, have an ideal absorption spectrum wavelength region, the three color mixture will not become completely black, whereby the density in a color image tends to be insufficient. Moreover, because of the incorrect registering of toner images of three primary colors, the toner of three primary colors alone is incapable of reproducing the clear black color required for characters and lines. In order to solve that problem, in addition to the three primary colors, black is also used to form a multicolor image as aforementioned.

In addition to the above-described electrophotography method of forming a latent image for forming a multicolor image, there are other methods of directly forming a electrostatic latent image on an image retainer using a multi-stylus electrode, a screen photosensitive member or control electrode and forming a magnetic latent image using a magnetic head. A recording apparatus utilizing the direct method is incorporated into such a system as shown in the block diagram of FIG. 19. In this example, a reader with a solid pickup element is used to read an original having multicolor optical data and the image data obtained is converted by an image processor into what is fit for the recording apparatus (hereinafter refer to as "recorded data").

There are two methods for expressing various colors according to the above-mentioned methods:

(1) A method of not directly superposing toners of different colors (FIGS. 20A, 20B); and (2) A method of superposing toners of different colors (FIG. 20C).

FIGS 20A through 20C illustrate an arrangement of toner colors written to an image retainer. As shown in FIG. 21A, in a first method, toners $T_1$, $T_2$ are distributed without being superposed to reproduce color artificially on recording paper. As shown in FIGS. 22 and 23, in a second method, toner of a certain color is superposed on a toner image of different color and developed to reproduce color.

However, in the case of electrophotography, for instance, because the color in the second method above is absorbed in the second the toner T previously developed and is unable to reach the photosensitive layer of the image forming body satisfactorily, a latent image is not completely formed. Consequently, the adhered quantity of toner $T_2$ developed later tends to decrease as shown in either FIG. 22 or FIG. 23. In the first method above, the registering of image exposure must be carried out strictly so that the toner image of one color is not exposed to the toner image of another color at the same position. If the image exposure is inaccurately positioned as shown in FIG. 21B, the toner image $T_1$ in the preceding stage will intercept part of the image exposure and the adhering quantity of the toner image $T_2$ developed in the following stage will tend to decrease as shown in FIG. 21C. That trend indicates that recording characteristics will differ according to the spectral sensitivity of an image retainer, the spectral characteristics of a light source for use in image exposure, the spectral transmittance characterisics of toner and the order of colors being developed.

On the other hand, although each of these latent image forming methods is capable of expressing gradation by means of multi-value recording, the expression of gradation through those methods requires a large capacity of image data because they rely on so-called multistage gradation. To provide high-speed stable recording with a small capacity of image data, accordingly, there has been proposed a method for expressing gradation artificially by converting each inputted picture element into a binary value. There are known, for example, the density pattern method of FIG. 24 and the dither method of FIG. 25 for toner of each color.

The density pattern method of FIG. 24 comprises converting a picture element having inputted gradation into one that has a plurality of binary gradations. In FIG. 24, there are shown an input image $1a$, a sample $2a$ for taking a picture element $5a$ having a representative density value of a matrix of the above-described input image $1a$ and processing the picture element $5a$, and $M \times N$ reference density matrix $3a$ for converting the sample into a binary value and a pattern $4a$ obtained as the result of which the sample $2a$ above is compared with the reference density matrix $3a$ and converted into a binary value.

The dither method of FIG. 25 is used to convert a picture element having the gradation of an input image into one that has binary gradation. In FIG. 25, there are shown an input image $1b$, a sample $2b$ representing a particular $M \times N$ picture element matrix of the input image $1b$, the sample $2b$ being used for the binary conversion process, a reference density $M \times N$ matrix $3b$ for converting the sample into a binary value and a pattern $4b$ obtained as the result of which the sample $2b$ is compared with the reference density matrix $3b$ and converted into a binary value. Such a pattern is arranged for each color of FIGS. 20A through 20C.

In the conventional multicolor image forming apparatus, the data obtained by subjecting the color image data received to color separation is recorded by comparing the data with a reference signal read out of a memory and converting it into a binary value. The following discriminating process, for instance, is applicable:

(1) A special discriminating sensor is used to read an original;

(2) When the area of a background is large, the original is judged as a line drawing, whereas it is judged as a gradation drawing when the area is small.

(3) When it is a line drawing, it is converted into a binary value as a dither matrix;

(4) Each image data on yellow, magenta, cyan and black is compared with a reference value and then converted into a binary value;

(5) The number of picture elements reaching the H level according to process step (4) is counted on a color basis and they are classified into Yo, Mo, Co, Ko;

(6) Judgement is made if there is a particularly large one among Yo, Mo, Co.;

(7) If the difference is large as the result of process step (6), it will be judged as a single color image and the predetermined dither matrix is applied to each color;

(8) If the difference of each color is small as the result of process step (6), it will be judged as a multicolor image and the predetermined dither matrix is applied to each color; and (9) The image data is processed.

If a multicolor image is formed based on the above-described conditions, any desired color will become reproducible and a recorded image fit for each kind of input image data will be obtainable.

If the image density and color reproducibility are specified by automatic control or by apparatus effecting operation externally, recording characteristics may be caused to change by controlling recording conditions such as the developing bias or charge potential of the recording apparatus when each toner image is formed. However, it is hardly possible by control of recording conditions alone to obtain the desired recording characteristics and completely prevent character jumping or fogging.

SUMMARY OF THE INVENTION

An object of the present invention is to provide a multicolor image forming apparatus and method capable of freely controlling image density and color reproducibility in conformity with instruction from an automatic control, the operator or external equipment.

The above object can be attained in the present invention by a multicolor image forming apparatus for forming a multicolor visual image on an image retainer by successively developing the latent images formed on the image retainer on a color basis characterized in that the diameter of dots constituting the visual image of each color or each color image signal cutting size out of a matrix unit consisting of each color picture elements is modulated (uniformly, if possible) by an electrical signal. In the above-described "modulation", it is preferred that the diameter of dots or signal cutting size is uniformly modulated by automatic control or external instructions in accordance with image forming conditions each time an image is formed.

The present inventors made studies ardently during the process of perfecting the present invention and have found the following fact. For instance, although various combinations are considered in setting and arranging density values of factors in a density matrix 3b of FIG. 25, the quality of the multicolor image ultimately obtained by forming recorded data with the density matrix as a signal and implementing recording based on the data is dependent on the combination of the number of toner dots of the factors and the width of the dots. A dispersed or centralized type matrix is prepared on a color component basis according to the present invention and in application of the above fact and a portion of fixed size is cut out of the matrix depending on the state of an input image and other conditions or the quantity of toner adhering to the photosensitive member is increased or decreased as the size of the factor within the matrix changes so that a multicolor image of high quality whose image density and color balance are adjustable can always be obtained.

In the present invention, the modulation signal (electrical signal) includes what is applicable indiscriminately to all units with a matrix having a particular size, such as a density matrix through the density pattern or dither method as a unit and another evenly applicable to all picture elements of image data. Moreover, each picture element includes what has been converted into a binary value and such a kind for obtaining recorded data by means of pulse width modulation in a picture element.

Other objects and aspects of the invention will become apparent from the following description of embodiments with reference to the accompanying drawings.

BRIEF DESCRIPTION OF THE DRAWINGS

FIGS. 1 through 17 illustrate embodiments of the present invention:

FIGS. 1, 9 and 11 are block diagrams of multicolor image forming apparatus.

FIG. 2A and FIG. 2B are diagrams explaining each case of picture element modulation and matrix size modulation, respectively.

FIGS. 3A and 3B are timing charts.

FIGS. 4A, 4B and 5 are graphs illustrating recording densities of each color.

FIG. 6 is a schematic view illustrating the construction of a multicolor image forming apparatus.

FIG. 7 is an enlarged sectional view of the developing device of FIG. 6.

FIG. 8 is a graph illustrating the density characteristics of a recorded image when the intensity of an electric field and frequency are changed.

FIGS. 10 and 12 are flowcharts illustrating image recording by multicolor image forming apparatus.

FIGS. 13A, 13B, 13C and 13D illustrate reference signal matrices.

FIG. 14 is a graph illustrating the spectral transmission characteristics of toner.

FIG. 15 is a partial enlarged view illustrating the multicolor image forming apparatus of FIG. 6 equipped with a sensor for measuring the charge potential of a photosensitive member.

FIGS. 16 and 17 are diagrams explanatory of picture element modulation.

FIGS. 18 through 25 illustrate the formation of toner images on image retainers.

FIG. 18 illustrates changes in the surface potential of the drum of the photosensitive member while used for recording.

FIG. 19 is a block diagram of a multicolor image forming apparatus.

FIGS. 21A, 21B, 21C, 22 and 23 are sectional views illustrating toner adhering to the photosensitive member while images are formed.

FIG. 24 illustrates a step for converting an input image into a binary value through the density pattern method.

FIG. 25 illustrates a step for converting an input image into a binary value through the dither method.

DESCRIPTION OF THE PREFERRED EMBODIMENT

Figure 4A:
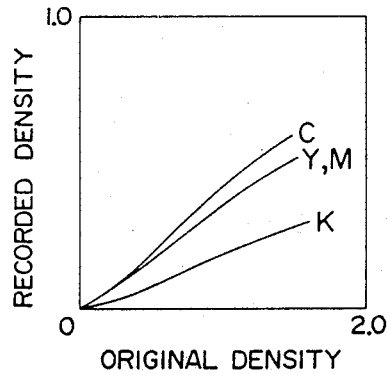

Referring to the drawings, the present invention will concretely be described.

Figure 6:
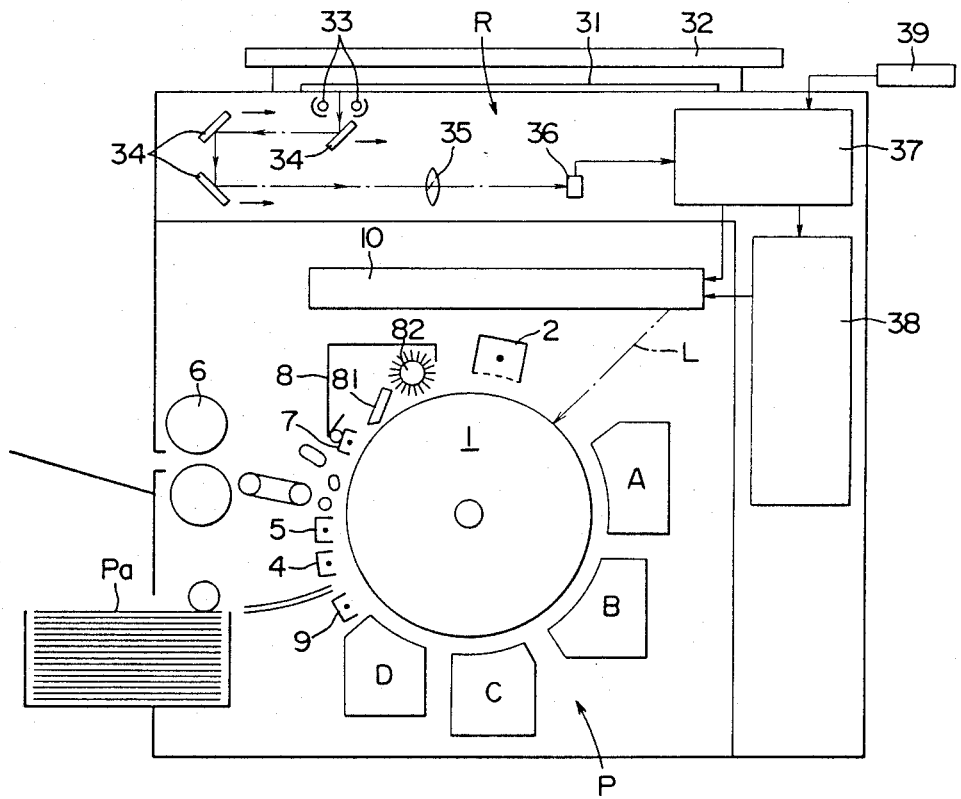

FIG. 6 is a schematic view illustrating the construction of a multicolor image forming apparatus embodying the present invention.

The apparatus comprises an image reader means R, an image data processing means 37, an image memory 38, a recording portion P and an external instructing means 39. A multicolor image is formed in the following manner. A light emitted from an original multicolor image (an original fixed by an original cover 32) 31 receiving light from a luminous source 33 reaches a color CCD (Charge Coupled Device) 36 through three mirrors 34 and a lens 35 moving to the right in FIG. 6. The color CCD 36 converts the intensity of the light into an electrical signal while it is scanning the original multicolor image and processes the electrical signal with the image processor 37 to obtain recorded data. The recorded data is stored in the image memory 38 as occasion demands. A semiconductor laser optical system 10 of the recording portion P is controlled by the recorded data thus obtained. In the image processing means 37, optimum recorded data for obtaining a multicolor image of high quality is obtained by selecting or changing a modulation signal according to instructions from the external instructing means 39 as described later with reference to FIGS. 1, 9 or 11. On the other hand, the surface of a photosensitive member 1 is uniformly charged by a scorotron charging electrode 2. Subsequently, an image exposure L is made through the laser optical system 10 on the photosensitive member 1 and an electrostatic latent image is thus formed. The electrostatic latent image is developed by a developing device A containing yellow toner. The photosensitive member 1 with the toner image formed thereon is uniformly charged by the scorotron charging electrode 2 again and provided with the image exposure L. The electrostsic latent image thus formed is developed by a developing device B containing magenta toner. Consequently, toner images of two colors, namely, yellow and magenta toner, are formed on the photosensitive member 1. In the same manner, cyan and black toners are superposed and a toner image of four colors is formed on the photosensitive member 1. The toner image of four colors is given an electric charge by a charge electrode 9 and transferred to a recording paper Pa by a transfer electrode 4. The recording paper is separated from the photosensitive member 1 by a separator electrode 5 and fixed by a fixing device 6, whereas the photosensitive member 1 is cleaned by a charge eliminating electrode 7 and a cleaning device 8.

The cleaning device 8 is equipped with a cleaning blade 81 and a fur brush 82, which keep in non-contact with the photosensitive member 1 while an image is being formed and, when a multicolor image is formed on the photosensitive member 1 and transferred onto transfer paper, it makes contact with the photosensitive member 1 to scrape off the remaining toner. Then the cleaning blade 81 separates from the photosensitive member 1 and the fur brush 82 will do so a little later. The fur brush 82 acts to remove the toner remaining on the photosensitive member 1 when the cleaning blade 81 is separated from the photosensitive member 1.

In the multicolor image forming apparatus, one color is developed each time the photosensitive member 1 turns once and each image exposure must start with the same position of the photosensitive member 1. Moreover, except for the developing devices and the charging electrode 2, each electrode, a paper feeding device, a paper carrier and the cleaning device 8, which are unused during the image formation, are not allowed to act on the photosensitive member 1.

In the multicolor image forming apparatus of FIG. 6, the recording portion P and the image data processor 37 in addition may be used as a multicolor printer independent of the other parts by supplying image data from the external equipment.

Figure 7:
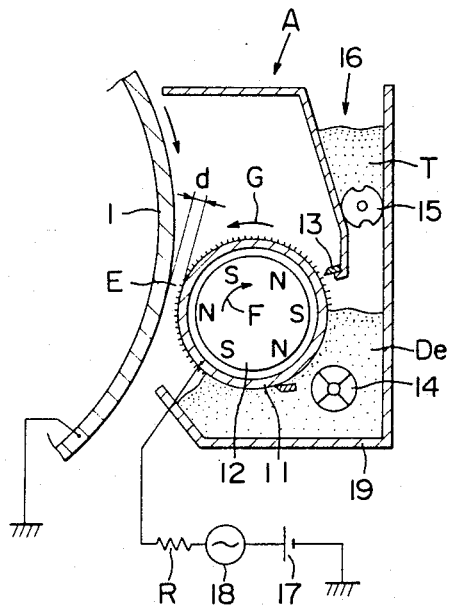

Each developing device, for example, the developing device A, is so constructed as shown in FIG. 7. The developing devices B, C, D basically have the same contruction. A developer De is carried in the direction of an arrow G when a magnetic roll 12 and a sleeve 11 turn in the directions of arrows F and G, respectively. The thickness of the developer De is controlled by an ear control blade 13 during carriage on sleeve 11. An agitating screw 14 is installed in a developer reservoir 19 so that the developer De may satisfactorily be agitated and, when the developer De in the developer reservoir is consumed, a toner supply roller 15 rotates and toner T is supplied from a toner hopper 16. A d.c. power supply 17 and an a.c. power supply 18 for supplying a developing bias to the sleeve 11, and a protective resistor R are connected in series. The sleeve 11 and the photosensitive member 1 are arranged opposite to each other with a gap d therebetween and toner is held in non-contact with the photosensitive member 1 in the developing zone E. This non-contact state is essential to acquire a preferred image, particularly in and after the second development.

The non-contact state means that the sleeve 11 and the photosensitive member 1 are arranged opposite to each other with the gap d therebetween while no difference in potential exists between them (while the developing bias is not applied) and the thickness of the developer layer is set smaller than the gap d. In so doing, the toner image already formed on the photosensitive member 1 is prevented from being damaged at and after the second development and, moreover, color shading is avoided because the toner attached to the photosensitive member 1 is prevented from going backward to the sleeve 11 and mixing into the developing device in the following stage, the latter containing toner of color different from that in the preceding stage and becoming muddy color.

On the other hand, the developing device of such an image forming apparatus, uses a two-component developer composed of toner and carrier and a one-component developer composed of toner only. In the case of the two-component developer, although the ratio of the quantity of toner to that of the carrier must be controlled, the advantage is that the frictional charge of the toner particles is readily controllable. Moreover, because a large quantity of black magnetic material need not be added to the toner particles in the case of the two-component developer, the color toner is prevented from becoming muddy and a clear color image can be obtained.

Such a two-component developer is usually composed of the following components (1) through (6):

(1) Thermoplastic resin (adhesive bonding agent) 80 to 90 percent by weight:

Example: polystyrene, styrene-acryl copolymer, polyester, polyvinyl butyral, epoxy resin, polyamide resin, polyethylene, ethylene-vinyl acetate copolymer or their mixture.

(2) Pigment (coloring matter)

Example:

black: carbon black;

cyan: copper phthalocyanine, sulfonamide dielectric dye;

yellow: benzidine derivative;

magenta: polytungstorin acid, rhodamine B lake, carmine 6B, etc.

(3) Charge controlling agent:

Positive polarity toner; electron donative dye of nigrosine series, metallic salt of naphthene acid or high grade fatty acid, alkoxylated amine alkylamide, chelate, pigment, fluorine-processed surface-active agent and class-4 ammonium salt;

Negative polarity toner: electron acceptive organic complex, chlorinated paraffin, chlorinated polyester, polyester with excessive acid radical, sulfonylamine of copper phthalocyanine, etc..

(4) Fluidizer

Example: colloidal silica, hydrophobic silica are typical, in addition silicon varnish, metal soap, nonionic surface-active agent, etc.

(5) Cleaning agent:

(which prevents the filming of toner on the photosensitive member)

Example: fatty acid metallic salt, silicon oxide having organic radical on the surface, surface-active agent of fluorine series, etc.

(6) Filler:
(which improves the surface luster of an image and reduces raw material cost)

Example: calcium carbonate, clay, talc, pigment, or the like.

In addition to the materials above, magnetic material for preventing fogging and toner from scattering may be contained in the developer.

As the magnetic material, 0.1~1 μm triiron tetraoxide, λ-ferric oxide, chrome dioxide, nickel ferrite, ferro-alloy powder, etc. have been proposed. However, triiron tetraoxide is widely used now and 5~70 wt% of it is contained in toner. The electrical resistance through 70 percent by weight of toner changes to some extent, depending on the kind and quantity of magnetic powder, and the quantity of magnetic material should preferably be lower than 55 percent by weight to make color toner retain sufficient electrical resistance. Furthermore, the quantity of magnetic material should preferably be lower than 30 percent by weight to maintain clear color as a color toner.

As resin is fit for a pressure fixing toner, adhesive resins such as wax, polyolefines, ethylenevinyl acetate copolymer, polyurethane, rubber and the like are selected so that they may adhere to the paper through plastic deformation with a force of about 20 kg/cm. Encapsulated toners are also usable.

Any known method can be employed to make toners using the above-described materials.

In order to obtain more desirable images according to the present invention, the preferred average toner particle size is about 50 μm or smaller in relation to resolving power. Although no limit is set to the toner particle size in view of the principle of the present invention, 1 through 30 μm is normally preferred in consideration of resolving power, toner scattering and carrying.

Moreover, magnetic carrier particles are composed of magnetic material powder and resin (e.g., magnetic powder and resin dispersed therein or resin-coated magnetic particles) and are preferably spherical to make delicate points and lines visible and to improve gradation. In addition, the average particle size is preferably 50 μm or smaller and most preferably smaller than 30 μm and larger than 5 μm.

The resistivity of the carrier should be greater than $10^8$ Ωcm, preferably greater than $10^{13}$ Ωcm and most preferably with insulation property greater than $10^{14}$ Ωcm to prevent the carrier from readily adhering to the image retainer as an electric charge is easily injected into the carrier particles by means of the bias voltage, which is detrimental to the formation of good images, and to prevent bias voltage from being insufficiently applied to the sleeve. In other words, the particle size should be such as aforementioned having the above resistivity.

The carriers thus formed into microspheres are obtainable by coating the surface of the magnetic material with the resin or dispersing magnetic microparticles in the resin to make particles using the magnetic material and thermoplastic resin usable for the toner and selecting the particle size by means of a conventional known means particle size selecting means. The carriers should preferably be spherical so that the toner and carriers may readily be agitated and carried and so that the agglomeration of toner and carrier particles is unlikely to occur and thereby by improving toner charge controllability. The method of making spherical magnetic carrier particles comprises, in the case of resin-coated carrier particles, selecting magnetic particles as spherical as possible and coating them with resin; and in the case of carriers with magnetic microparticles dispersed therein, preparing dispersable resin particles from magnetic material particles as minute as possible and making them spherical by using hot air or water, or otherwise directly forming spherical dispersable resin particles through the spray-dry method.

In the image forming method according to the present invention, the developing methods proposed in U.S. Pat. No. 3893419, Japanese Pat. Laid-Open Nos. 55-18656 through 18659, 56-125753 employing a one-component developer and Japanese Pat. Appln. Nos. 58-57446, 58-97973, 59-4563, 59-10699, 58-238295, 58-238296, 59-10700 using a two-component developer may be used.

Particularly, the developing method using the two-component developer according to Japanese Pat. Appln. No. 58-238296 should satisfy the following conditions during each step of the developing process for the multicolor image formation, $$0.2 \leq V_{AC}/(d \cdot f)$$

$$\{(V_{AC}/d) - 1500\}/f \leq 1.0$$

where $V_{AC}$=amplitude of the a.c. component of the developing bias in V; f(Hz)=frequency; and d(mm)=gap between the image retainer and the developer carrier for carrying the developer.

An image of high quality can thus be obtained by selecting the developing conditions, such as the a.c. bias and frequency, without disturbance of the image and color mixture.

The reasons for the excellent developing effects will now be described on the basis of the results obtained from the experiments made by the present inventors. The experimental conditions set are as follows:

The two-component developer composed of magnetic carrier and non-magnetic toner was used as a developer. The average particle size of the magnetic carriers was 30 μm (the average particle size described in the present specification was average particle size by weight, which was measured using Omnicon Alpha (Baush and Lomb Inc.) and Coulter Counter (Coulter Electronics, Inc.). The carrier was spherical and prepared from resin with magnetization at 50 emu/g, a resistivity of $10^{14}$ Ωcm or more and having ferrite microparticles dispersed therein. The resistivity disclosed in the present specification is obtained through the method comprising the steps of putting particles into a container 0.5 cm² in cross section, tapping the container, then applying a load of 1 kg/cm² on the packed particles, arranging the thickness of carrier particles at about 1 mm, applying voltage so that an electric field of 1,000 V/cm across the load and the bottom electrode is produced and reading the current value. The toner used was obtained by mixing 90 percent by weight thermoplastic resin, 10 percent by weight pigments and a small quantity of charge controlling agent together, kneading and grinding the mixture into particles having an average size of 10 μm. The 80 percent by weight carrier was mixed with the 20 percent by weight toner to prepare a developer. The toner is positively charged because of the friction with the carrier. A toner image was formed on an image retainer beforehand.

Figure 8:
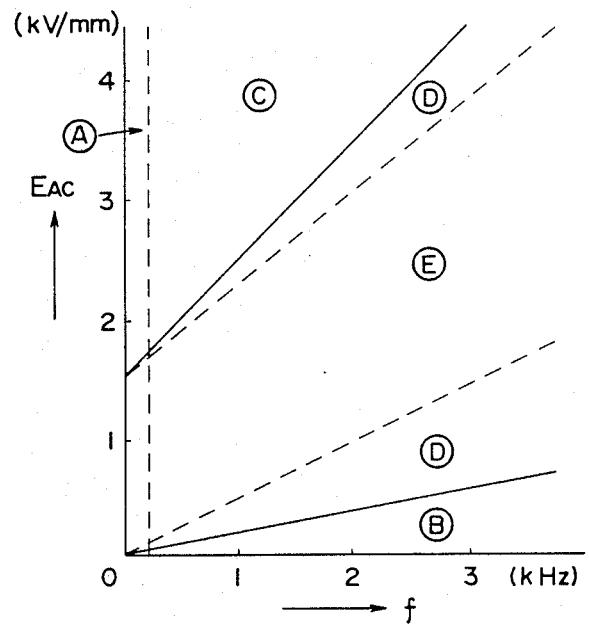

When tests were carried out while the difference between the a.c. bias and the photosensitive member 1 as well as the sleeve 11 was changed, the relation between the amplitude $E_{AC}$ of the intensity of the a.c. electric field and the frequency f could be put in order as shown in FIG. 8. In FIG. 8, Ⓐ represents a region where development irregularities tend to occur; Ⓑ a region where the effects of the a.c. component do not appear; Ⓒ a region where the toner is apt to return back; and Ⓓ and Ⓔ regions where the effects of the a.c. component appear and the toner is prevented from returning back, the region Ⓔ being proved to be particularly preferable.

The results obtained show there exists a suitable region relative to the amplitude and the frequency of the a.c. component in order to develop the next toner image (in the following state) with a proper density without destroying the toner image formed on the photosensitive drum in the preceding stage.

Based on the above-described test results, a conclusion was drawn in that, if development was carried out in each development steps in such a manner as to satisfy $$0.2 \leq V_{AC}/(d \cdot f)$$

$$\{(V_{AC}/d) - 1500\}/f \leq 1.0$$

where $V_{AC}(V)$ = amplitude of the a.c. component of the development bias; f(Hz) = frequency; d = gap between the photosensitive drum and the sleeve, the following development would be made with a proper density without disturbing the toner image already formed on the image retainer. Of the above-described conditions, it is preferred to safisfy $$0.5 \leq V_{AC}/(d \cdot f)$$

$$\{(V_{AC}/d) - 1500\}/f \leq 1.0$$

to obtain a fully satisfactory image density and prevent the toner image formed in the preceding stage from being disturbed. Furthermore, particularly if $$0.5 \leq V_{AC}/(d \cdot f)$$

$$\{(V_{AC}/d) - 1500\}/f \leq 0.8$$

is satisfied, a clearer, turbidity-free multicolor image can be obtained and, even if the rotating operation is repeated a number of times, toner of different colors is prevented from mixing therewith.

It was found that the frequency of the a.c. component should preferably be set at over 200 Hz to prevent development irregularities because of the a.c. component and, when a rotary magnetic roll is used as means for supplying a developer to a photosensitive drum, the frequency of the a.c. component should further preferable be set at over 500 Hz to nullify the influence of beat resulting from the a.c. component and the rotation of the magnetic roll.

As the developer is carried to the image retainer (photosensitive drum) on a non-contact basis in the above-described examples, the toner must be sent flying to a latent image surface by means of the a.c. bias. However, the toner particles are subjected to the electric force directed from the developing device to the image retainer and also the opposite direction between the image retainer and the developing device by means of the a.c. phase. The latter causes the toners on the image retainer to move toward the developing device and the toner of different color to mix into the developing device. To develop the following toner images on the image retainer successively with a constant density, while preventing the above-described phenomena without destroying the toner image formed on the image retainer, it is preferred to employ one of the following steps or any combination of them as repeating the development:

(1) In each successive development use of toner having a larger charged quantity;

(2) Similarly gradually decrease the amplitude of the a.c. component of the developing bias; and (3) Similarly gradually raise the frequency of the a.c. component of the developing bias.

In other words, the larger the charged quantity the toner particles have, the greater the influence of the electric field being effected. Accordingly, if toner particles having a large charged quantity are attached to the image retainer during the initial development, the toner particles may return to the sleeve in excessive development. For this reason, toner particle having a smaller charged quantity should be used during the initial development as in the case of step (1) above so as to prevent the toner particles from returning to the sleeve at the time of development in the following stage. In the case of step (2) above, it is intended to prevent the toner particles attached to the image retainer from returning thereto by gradually decreasing the intensity of the electric field as the development is repeated (i.e., in the development in later stages). As concrete methods of decreasing the intensity of the electric field, there are those of gradually reducing the voltage of the a.c. component and of gradually widening the gap d between the photosensitive member and the sleeve in the development of later stages. In the case of step (3) above, it is designed to prevent the toner particles already attached to the image retainer from returning to the developing device by gradually raising the frequency of the a.c. component as the development is repeated. Those steps (1), (2) and (3) above will be effective even if they are independently used. However, if they are employed in combination, e.g., the charged quantity of toner is gradually increased as the development is repeated, while the a.c. bias is simultaneously gradually decreased, they will be further effective further. Moreover, a proper image density or a color balance can be held by regulating each d.c. bias when the above-described three methods are employed.

The following methods (4) through (8) other than (1) through (3) may also be used:

(4) Developing devices being unused are placed apart from the image retainer;

(5) The quantity of the toner supply is gradually increased;

(6) The latent potential contrast is gradually increased;

(7) The gap between the image retainer and the developer layer is gradually increased; and (8) The bias is applied so that the toner cannot enter the developing devices being unused (the d.c. component only is applied while the application of the a.c. component is stopped and the d.c. component with polarity opposite to that of the toner is applied or kept in a floating state).

In addition to the above-mentioned test examples, a one-component developer may be used to develop under the conditions described in Japanese Pat. Appln. No. 58-238295. FIG. 1 is a block diagram of a system for selecting a modulation signal for processing input image data according to the instructions externally given and converting the signal into a binary value. In the system of FIG. 1, a plurality of groups of modulation signals are prepared to control the recording characteristics and the suitable group of signals is used for processing.

Figure 5:
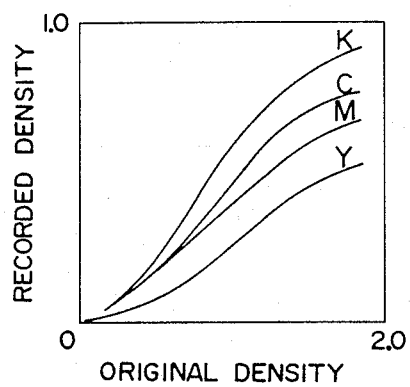

On the other hand, the modulation signals are not used in the multicolor image forming apparatus of FIG. 6 but the dither patterns shown in FIG. 25 are employed on common conditions. Monochromatic images of yellow-Y, magenta-M, cyan-C and black-K are respectively formed as shown in FIG. 20A to obtain recording characteristics shown in FIG. 5. In that case, satisfactory color balance is unavailable unless the densities of C, M, Y are matching.

On the contrary, the following control is possible using the system on FIG. 1 according to the present invention.

(1) The size of each dot was modulated at 12 dot/mm on a color basis using a semiconductor laser (FIG. 2A).

In other words, the dot width was changed uniformly by specifying the oscillation time to change the image density (FIG. 3A).

For instance, the recording densities of the three primary colors were made to coincide by selecting units, 2T for yellow, 3/4T for magenta and 3/4T for cyan, provided the period of one picture element was T. As for black, 3/4T was maintained because this unit of black was sufficient for tightening the image. Consequently, the recording characteristics shown in FIG. 4A were obtained.

The toner image of four colors thus obtained showed an excellent color balance.

On the other hand, the color balance and the image density could be changed freely by changing the pulse width according to an external signal. When green color was emphasized, for instance, the pulse width corresponding to Y and C was set lengthy, whereas the pulse width for M was made short.

Figure 20B:
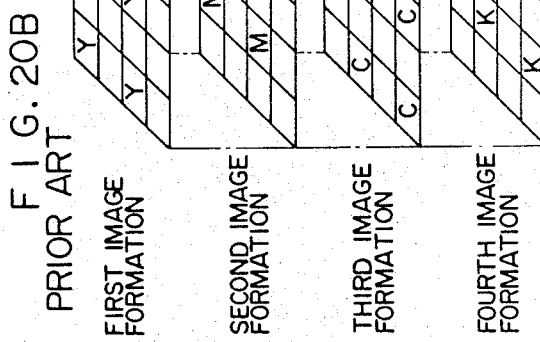
FIGS. 20A, 20B, 20C illustrate examples of superposed toner of various colors.
Figure 20C:
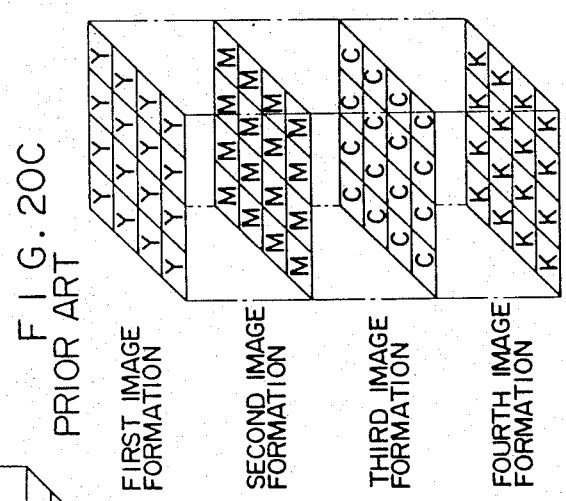
Figure 20A:
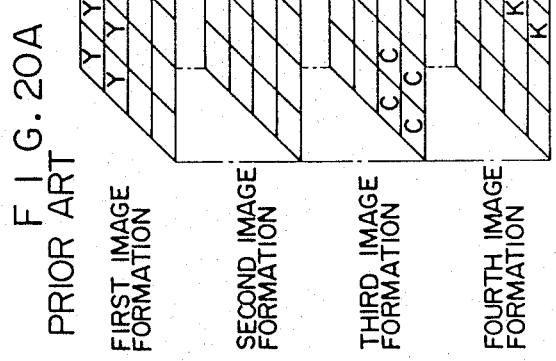

Good results were obtained similarly from the superpositions of FIGS. 20B, 20C. Although a semiconductor laser which can readily be subject to pulse modulation was referred to in the description above, an ordinary gas laser (e.g., He-Ne laser) may be used and the same effect is available by making the beam of elliptic section and changing the number of dots in one picture element composed of several dots.

(2) Each monochromatic image was formed as shown in FIG. 20B and the cutting size according to each matrix was modulated by the semiconductor laser on a color basis. In other words, the image density was changed by specifying the writing time with integer times the picture element and limiting it to the size of the matrix so as to write data in part of the matrix.

For instance, the writing range was specified as a 8×8 matrix for Y, a 6×8 matrix for M and a 6×6 matrix for C. As for black, it was specified as a 4×4 matrix as it was only intended to tighten the image by the addition of black.

As shown in FIG. 2B, the size of the matrix for each color was 4×4 for Y, 3×4 for M, 3×3 for C and 2×2 for K.

Figure 4B:
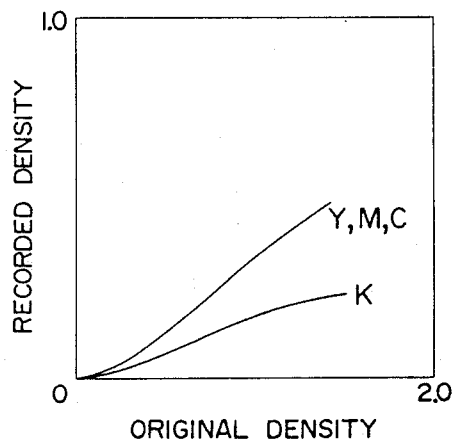

The recording characteristics shown in FIG. 4B were thus obtained. Those characteristics resulted in the formation of a toner image of four colors with an excellent color balance (FIG. 3B).

FIG. 3B shows a time chart illustrating one scanning of each of Y, M, C and K of FIG. 2B.

On the other hand, the color balance and the image density could freely be changed by changing the size of a matrix to be cut according to an external signal. When red was emphasized, the size of the cut matrix corresponding to Y, M was set large, whereas the size of the cut matrix corresponding to C was set small.

The superposition of the patterns shown in FIGS. 20A and 20C displayed excellent results.

As the result of selection of the modulation signal, the relation between the input image density Do and the recorded image density Dp became controllable as shown in FIG. 4A. FIG. 4 or 3 represents an example and in no way limits the application of the present invention to the use aforementioned examples. While these examples employ the dither method, a different dither pattern may be used for each color, and this technical idea is also applicable to the density pattern method without alteration.

Figure 9:
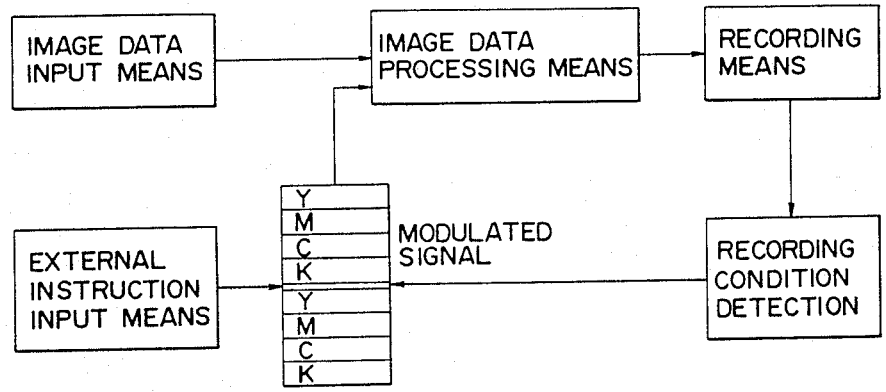
Figure 10:
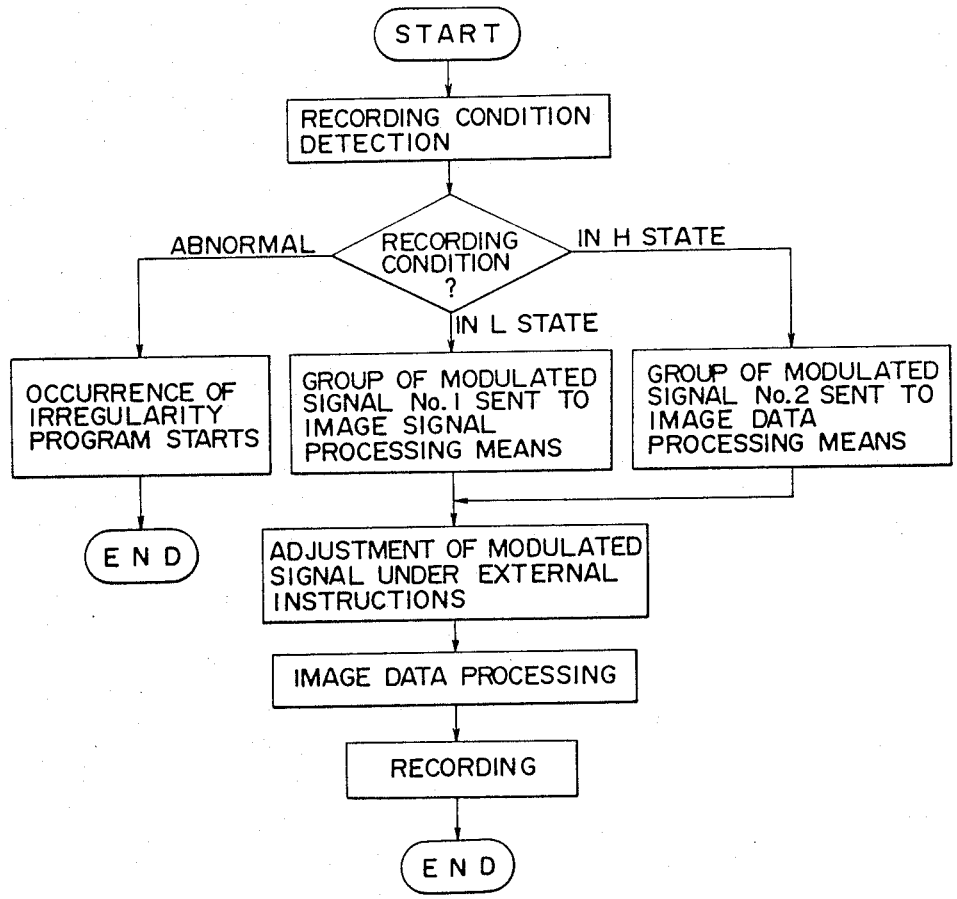

FIG. 9 is a block diagram of a system employing the multicolor image forming apparatus of FIG. 6 as a recording device. The system is designed to detect the recording conditions of the recording device and to select a preferred one of the prepared groups of modulation signals for processing input image data according to the results detected, and instructions externally given are also involved in the selection of the modulation signal. The image data processing means operates so as to set the modulation signal in accordance with the flowchart shown in FIG. 10.

As to the recording conditions, importance should be attached to the surface potential of the photosensitive member, the intensity of image exposure light, the density of toner contained in the developer, the developing bias, the toner charged quantity, the fluidity of the developer, the fixing temperature, the atmospheric temperature and the humidity. The data relevant to the above-described items are detected, as shown in Table 1, by a potentiometer, optical sensor, piezoelectric element and thermocouple and sent to the image data processing means.

Figure 11:
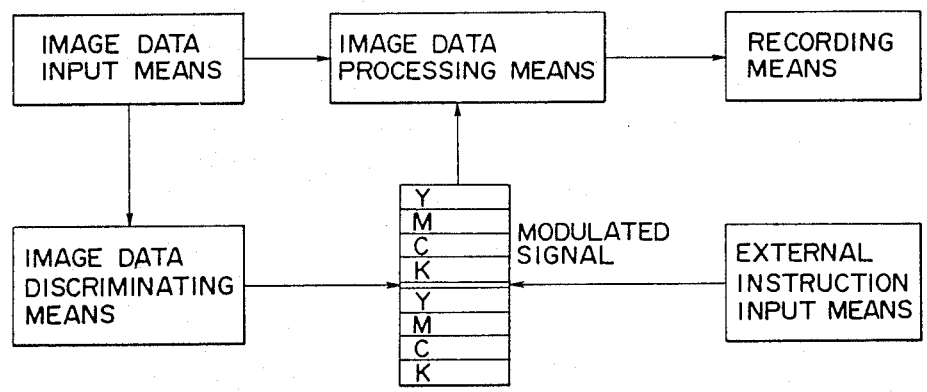
Figure 12:
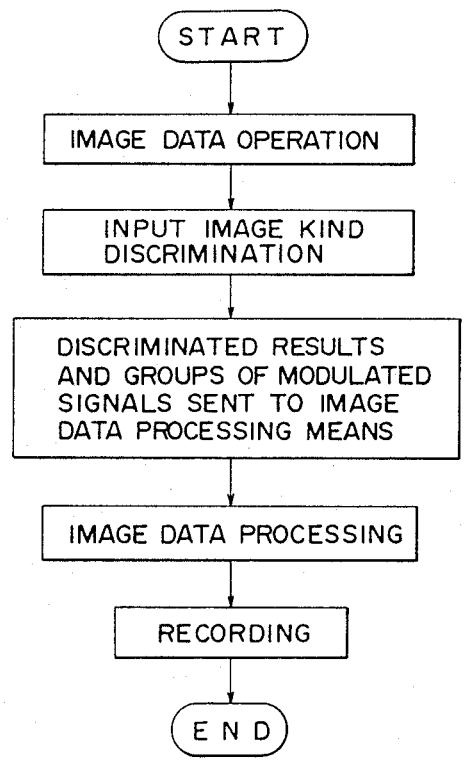

FIG. 11 is a block diagram illustrating a multicolor image forming system capable of selecting a modulation signal depending on the kind of input image signal. In the system shown in FIG. 11, the input image data is judged to determine whether it is composed of character data, monochromatic image or color image and, after the dither pattern is determined, the result so obtained and the modulation signal in accordance with the external instructions are used to convert the result into a binary value. FIG. 12 is a flowchart illustrating an outline of the procedure.

Embodiments of the invention will be described in further detail.

TABLE 1

| Recording conditions | Detection method | | | | | | |
|---|---|---|---|---|---|---|---|
| | Light intensity detection by optical sensor | Reflected density detection by optical sensor | Detection of developer quantity (level) (pressure or magnetic type) | Non-contact potential sensor | Temperature sensor (thermistor, thermocouple, etc.) | Humidity sensor (resistor, element, etc.) | Voltmeter |
| Charge potential | | (o) | | o | | | o |
| Exposure quantity | o | (o) | | o | | | |
| Toner density | | o | o | | | | |
| Developing bias | | (o) | | | | | o |
| Toner charge quantity | | (o) | | o | | | |
| Fluidity of developer | | (o) | o | | | | |
| Fixing temperature | | | | | o | | |
| Atmospheric temperature | | | | | o | | |
| Humidity | | | | | | o | |

EXAMPLE 1

In the multicolor image forming system of FIG. 1, input image data is supplied by a computer (not shown) and converted into a binary value by the image data processing means through the dither method. The recording means P of FIG. 6 is then employed as a recording device.

Dither matrix is set as shown in FIG. 13 in the case of a gradation image. FIGS. 13A, 13B, 13C and 13D, respectively, represent dither matrices corresponding to yellow, magenta, cyan and black color data, with the numerical values indicating the density level ranging from 0 to 63.

In FIG. 13, what is shown represents dot dispersive type dither matrices. In FIGS. 13A, 13B, 13C, 13D, the reproduced threshold values are gradually lowered and the color balance is favorably held when yellow, magenta, cyan and black are developed in order. The operator is allowed to freely choose the color balance out of "stressed blue", "stressed green" and "stressed red", and, furthermore, to choose the image density out of "dense", "ordinary" and "thin". Based on the instructions, the operator is capable of obtaining recording image data by changing the size of the matrix to be cut out.

The aforementioned choices and instructions are implemented through the operation of a button switch or lever switch (not shown) provided in the external instruction means 39 of FIG. 6.

The stressed green, for instance, was implemented as follows:

The photosensitive member 1 was uniformly charged by the scorotron charging device with +700 V and supplied by the semiconductor laser with an electrostatic latent image corresponding to yellow toner. The dither matrix (4×4) shown in FIG. 13A was used to form the electrostatic latent image and adjusted so that the color balance after the development of each color might be held to what is shown in FIG. 4.

The results obtained were written to the distributed yellow portion as shown in FIG. 20C. The electrostatic latent image was subjected to non-contact development under an a.c. bias using the developing device of FIG. 7.

Subsequently, the image retainer was rotated without being subjected to development by the other development devices and was again charged by the scorotron charging device (as in a case where the image retainer might be subjected to charge elimination by lamp or corona discharge). A matrix 3×3 in size was cut out of the dither matrix shown in FIG. 13B and written to the magenta portion, distributed as shown in FIG. 20C, and then subjected using magenta toner to non-contact development under the a.c. bias.

Subsequently, the dither matrix shown in FIG. 13C was used, after recharging, to write the cut matrix (4×4) to the cyan portion and then subjected to non-contact development under a.c. bias using cyan toner in the same manner as with the prior toner.

Then, the dither matrix (2×2) shown in FIG. 13D was used, after recharging, to write the cut matrix to the black portion and then subjected to non-contact development under a.c. bias using black toner (as a blackish image was obtained at the dither matrix (4×4), 2×2 in size was cut). Subsequently, the toner image superposed on the image retainer was transferred to paper by corona transfer after the corona charge and fixed thereto.

The toner remaining after the transfer was deprived of an electric charge and removed by cleaning means from the image retainer.

Table 2 and FIG. 14 show the recording conditions and spectral reflection factor characteristics, respectively.

TABLE 2

| | |
|---|---|
| Photosensitive member | Se/Te drum (Se layer thickness 60 μm, dia. 150 mm) |
| Developer | |
| Yellow toner<br>Magenta toner<br>Cyan toner<br>Black toner | Average particle size: 11 μm<br>Specific resistance: over $10^{14}$ Ωcm<br>Average charge quantity after mixed with carriers: 15 μc/g |
| Carrier | Average particle size: 20 μm<br>(Magnetic powder resin dispersion series)<br>Specific resistance: $10^{14}$ Ωcm |
| Toner density | 15 wt % |
| Charge potential | 700 V (by scorotron) |
| Exposure light source | Semiconductor laser (GaAlAs)<br>Oscillating wavelength: 800 nm |
| Recording density | 16 dot/mm |
| Linear speed | 200 mm/sec |
| Developing device | Sleeve ... 24.5 mm in dia.<br>Rotating at linear speed of 100 mm/s*<br>Inner magnet ... 12 poles, rotating<br>(sleeve surface) max. 800 G, 1000 rpm* |
| Developing bias | d.c. component 600 V<br>a.c. component 1.5kV<br>(effective value) 2k Hz } Common* |
| Gap between photosensitive member and sleeve | 1.0 mm |

TABLE 2-continued

| | |
|---|---|
| Photosensitive member | Se/Te drum (Se layer thickness 60 μm, dia. 150 mm) |
| Developer layer thickness | 0.5 mm |
| Transfer | Electrostatic transfer |
| Fixing | Hot roller |
| Cleaning | Blade + fur brush |
| Developing order | Yellow-magenta-cyan-black |

*Values during developing

When the color image was thus recorded, an image was obtained offering excellent color balance and resolving power in conformity with the operator's instructions.

EXAMPLE 2

In the multicolor image forming apparatus of FIG. 9, the input image data is given by an image memory (not shown) and converted into a binary value in the image data processor means through the dither method. The recording means of the apparatus of FIG. 6 is used as the recording device. The dither matrix detects the following recording conditions and sets them in a favorable manner. The remaining conditions are the same as those of example 1.

This example employs the method of uniformly adding and subtracting a fixed value to and from each threshold of the dither matrix according to the detecting signal under the recording conditions shown in the block diagram of FIG. 9.

In that multicolor image forming apparatus, there is provided a reference of about 1 cm² in the specific transfer portion, for instance, the edge portion on the photosensitive member when an image is formed. The density is read by an optical sensor comprising a LED (light emitting diode) as a light emitting element, a phototransistor as a light receiving element and a filter. The reference toner image density the compared with a reference value by a detection circuit (not shown) built in an operational circuit. When the reference image density does not reach the reference value, toner is supplied from a toner hopper, and it is judged to be in a low density recording state and its threshold value is set small. Furthermore, the surface potentiometer 21 shown in FIG. 15 is used to measure the charge potential of the photosensitive member 1 and, if the potential of the exposed portion is consequently low, it is judged to be a high density recording state. Conversely, it is judged to be a low density recording state if the potential is high. The threshold is thus determined.

Adjustment was made to provide a constant color balance for any color as shown in FIG. 4, irrespective of the environmental conditions. In that case, good color balance was obtained, provided toner images of yellow, magenta, cyan and black are superposed on the photosensitive member in that order.

As set forth above, recording image data can be prepared by selecting color balance recording conditions as warranted under the recording conditions and modulating cutting out of the matrix size.

When a color image was thus recorded, desired color reproduction was realized and color reproducibility was made constant by compensating for changes in recording conditions, such as environmental changes and the alteration of the apparatus with time by selecting a suitable dither matrix.

EXAMPLE 3

In the multicolor image forming system of FIG. 11, the multicolor image forming apparatus of FIG. 6 was used under the following conditions. That is, the CCD pickup element was used to read an original and obtain input image data, which was expressed through pulse width modulation and the dither method in the image data processing means in terms of gradation. The matrix (dither matrix) was selected among the dither patterns set as suitable for the purpose and as a result of which the input image data was discriminated in terms of linear gradation. Other conditions are the same as those of the example 1.

The centralized dither matrix was used and the colors were distributed as shown in FIG. 20B. Then the toner coloring degree and developing conditions were adjusted with the input image data processed with the common dither matrix. As a result, it was proved that each color balance was favorable, provided that a multicolor image was formed by superposing toner images of yellow, magenta, cyan and black in order.

In that multicolor image forming system, there was employed, as shown in FIGS. 16 and 17, a method for evenly adding and subtracting the picture element sized to and from each modulation signal of the dither matrix under instructions from the operator. In FIG. 16, one picture element is divided into four sub-elements to provide pulse width modulation. FIG. 17 illustrates an example of emphasizing blue color wherein the Y picture element is written on and after the second sub-element of the first row and on and after the third sub-element of the second row.

On the other hand, M, C and K picture elements are written on to the first sub-element onward.

Accordingly, it is possible to emphasize a particular color by not only changing the image density but also by increasing or decreasing different data on a color basis.

As the recording device for the examples described above. However, the recording device is not limited to use in the aforementioned examples. For instance, one may be used having image forming means comprising a charge electrode, an image exposure means and a developing device which are arranged in series around a photosensitive member so that a multicolor image is formed with one revolution of the photosensitive member at a time. Moreover, one may use the system described in Japanese patent application No. 58-183152, the electrostatic recording system in Japanese patent application No. 58-187001 and the magnetic recording system in Japanese patent application No. 59-13167.

Effect of the Invention

As set forth above, the multicolor image forming apparatus and method according to the present invention are capable of setting proper conditions for each color because the dot diameter and matrix cutting size are modulated and provide recorded images of high quality with controlled image density and color balance.

What is claimed is:

1. A multicolor image forming apparatus for forming a multicolor visual image comprising: an image retainer, means for successively forming and developing latent images on the image retainer on a color basis, and means for modulating uniformly for each color the size of a dot per one picture element constituting the visual image of each color to effect control of color balance in said multicolor visual image.

2. A multicolor image forming apparatus as claimed in claim 1, wherein the means for modulating the size of said dot comprises automatic control or external instruction means which effect uniform modulation in accordance with image forming conditions which exist each time an image is formed.

3. Apparatus for forming a multicolor visual image comprising:
an image retainer;
and first means for successively forming and developing a plurality of latent images on said image retainer so as to provide a plurality of developed images which together form said multicolor visual image,
each latent image comprising picture elements,
each developed image being monochromatic and comprising color dots;
said first means including modulation means for controlling the size of a dot per one picture element for each color to modulate the color density of picture elements in a developed image to thereby control the color balance in said multicolor visual image.

4. Apparatus according to claim 3 wherein said first means further includes second means which determine and are responsive to image forming conditions which exist each time a latent image is formed and which regulate operation of said modulation means in accordance with said conditions.

5. Apparatus for forming a multicolor visual image comprising:
an electrostatic image retainer;
and first means for successively forming and developing a plurality of latent images on said image retainer so as to provide a plurality of developed monochromatic images which together form said multicolor visual image,
each latent image comprising picture elements comprising electrostatically charged regions and electrostatically discharged regions,
each developed image comprising color dots corresponding to the size of said electrostatically discharged region,
said first means including modulation means operable to modulate the color density of the picture elements in a developed image by changing the size of electrostatically charged regions per one picture element uniformly for each color to thereby control the color balance in said multicolor visual image.

6. Apparatus according to claim 5 wherein said first means further includes second means which determine and are responsive to image forming conditions which exist each time a latent image is formed and which regulate operation of said modulation means in accordance with said conditions.

7. Apparatus for forming a multicolor visual image comprising:
an electrostatic photoresponsive image retainer (1) on which a plurality of latent images can be successively formed and developed to provide said multicolor visual image;
an optical system (10) for forming said latent images on said image retainer;
image data input means for providing input image data signals;
image data processing means for receiving said input image data signals and for operating said optical system (10) for cause the latter to successively form and effect development of a plurality of latent images on said image retainer,
each latent image corresponding to one color in said multicolor visual image and comprising picture elements comprising an electrostatically charged region and electrostatically discharged region;
and instruction means for providing modulation signals to said image data processing means to control the size of discharged regions per one picture element uniformly for each color and thereby control the color density of a developed latent image.

8. Apparatus according to claim 7 wherein said image data input means comprises:
means for receiving light from an original image and for converting it into light intensity signals usable by said image data processing means;
and wherein said image data processing means operates on said light intensity signals in accordance with modulation signals from said instruction means.

9. Apparatus according to claim 7 wherein said image data input means comprises means for generating input image data signals for said image data processing means.

10. Apparatus according to claim 6 or 7 further including means which determine and are responsive to image forming conditions which exist at said image retainer (1) each time a latent image is formed and for operating said instruction means in accordance with said conditions.

11. Apparatus according to claim 7 further including memory means (38) for receiving and storing input image data signals from said input image data means and for furnishing them to said optical system.

12. A method for forming a multicolor visual image on an image retainer comprising the steps of:
successively forming and developing a plurality of latent images on said image retainer so as to provide a plurality of developed monochromatic images which together form said multicolor visual image,
each latent image comprising picture elements,
each developed image comprising color dots,
and modulating the color density of the picture elements in a developed image by modulating the size of a dot per one picture element uniformly for each color to thereby control the color balance in said multicolor visual image.

13. A method according to claim 12 wherein the step of modulating color density is carried out in accordance with image forming conditions which exist each time a latent image is formed.

14. A method for forming a multicolor visual image on an electrostatic photoresponsive image retainer comprising the steps of:
successively forming and developing a plurality of latent images on said image retainer so as to provide a plurality of developed monochromatic images which together form said multicolor visual image;
each latent image comprising picture elements comprising electrostatically charged regions and discharged regions;
modulating the color density of a developed monochromatic image to effect color balance in said multicolor visual image by regulating the size of discharged regions per one picture element uniformly for each color;

and applying a uniform electrostatic charge to said image retainer prior to formation of each latent image and after development of any preceding latent image.

15. A method for forming a multicolor visual image on an electrostatic image retainer comprising the steps of:

applying a uniform electrostatic charge to said image retainer;

forming a first electrostatic latent image on said image retainer, which first latent image comprises picture elements comprising electrostatically charged regions and discharged regions;

developing said first latent image to provide a first developed image of one color;

applying another uniform electrostatic charge to said image retainer with said first developed image thereon;

forming a second electrostatic latent image on said image retainer with said first developed image thereon, said second latent image comprising picture elements comprising electrostatically charged regions and discharged regions;

developing said second latent image to provide a second developed image of another color which, together with said first developed image, provides said multicolor visual image on said image retainer;

and controlling the size of said electrostatically discharged regions per one picture element uniformly for each color during formation of each electrostatic latent image to thereby control the color density of each developed image.

* * * * *